G. EASTMAN.

Mirror and other Frames.

No. 8,905. Reissued Sept. 23, 1879.

WITNESSES

J. E. Carpenter.

Geo. H. Byington.

INVENTOR

George Eastman by his Attys

Clarke & Raymond.

THE NORRIS PETERS CO., PHOTO-LITHO., WASHINGTON, D. C.

UNITED STATES PATENT OFFICE.

GEORGE EASTMAN, OF CAMBRIDGE, MASSACHUSETTS.

IMPROVEMENT IN MIRROR AND OTHER FRAMES.

Specification forming part of Letters Patent No. 201,394, dated March 19, 1878; Reissue No. 8,905, dated September 23, 1879; application filed August 4, 1879.

*To all whom it may concern:*

Be it known that I, GEORGE EASTMAN, of Cambridge, in the county of Middlesex and Commonwealth of Massachusetts, have invented an Improvement in Mirror and other Frames, (for which Letters Patent No. 201,394 were granted to me March 19, 1878,) of which the following is a specification.

This invention relates to the following-described means for fastening a mirror or other article to the frame or the back supporting it.

Figure 1:
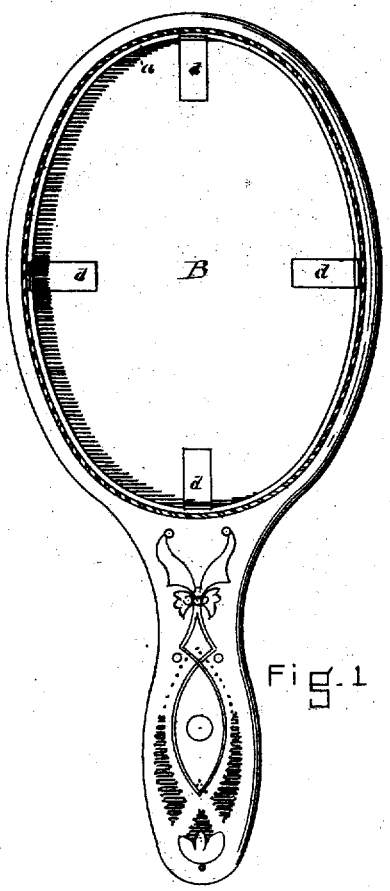
Figure 2:
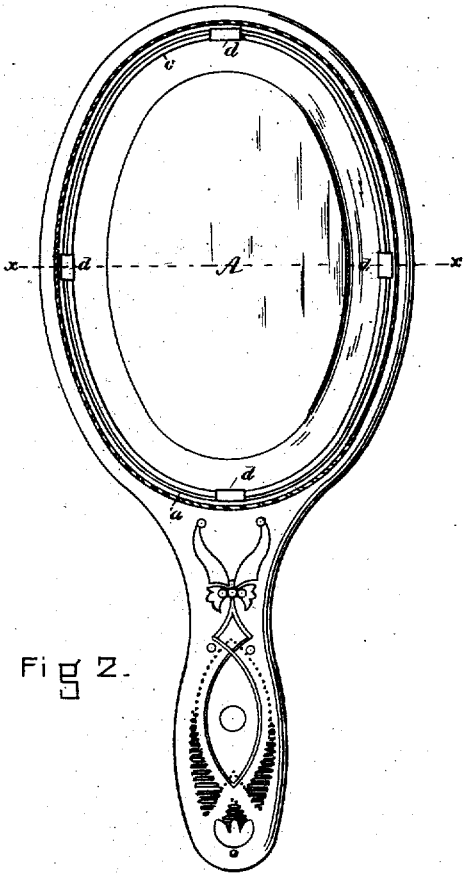
Figure 3:
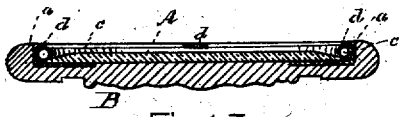
Figure 4:
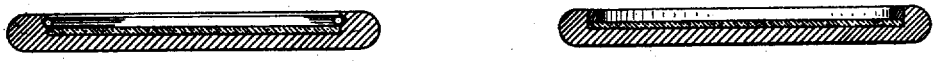

In the drawings, Figure 1 is a plan of the frame or back with the mirror removed, showing metal ties embedded therein. Fig. 2 is a plan of the completed article. Fig. 3 is a cross-section on the line *x x* of Fig. 2, and Fig. 4 illustrates the state of the art.

Heretofore, in hand-mirrors with composition backs and handles, it has been customary to cement a retaining-strip to the wall surrounding the mirror, or to undercut the wall sufficiently to allow a retaining-wire to be inserted therein and slightly project on the edge of the mirror to fasten it in the mirror-frame. The wire was sprung into the groove, and retained its place therein without being otherwise secured to it. This last-named construction is shown in Fig. 4, and is quite defective, owing to the liability of the wire to dislodge from a sudden blow.

In my invention the wall *a*, surrounding the mirror A or other article to be framed, is not undercut. An auxiliary frame, which laps upon the edge of said mirror A or other article to be framed, is rigidly secured to the back of the frame B by metallic ties, which are fastened, inserted, or embodied in the main frame B, and which also engage with said auxiliary frame *c*, so as to firmly attach it to the back or main frame, B.

In the drawings, A is the mirror. *a* is the surrounding wall, and B the main frame. *d* are the metallic fastenings, which engage with their upper ends the retaining or auxiliary frame which surrounds the outer edge of the mirror A, or other article to be fastened, and secures it to the back B. The auxiliary or retaining frame is shown as a wire.

In mirror or other frames made of a plastic composition molded to shape, I prefer to fasten the ties or clamps therein by pressure—that is, the clamps are placed in the mold with the formative material from which the frame is shaped, and by the setting or compression of the composition around them when under pressure are rigidly united thereto; and I prefer to make that portion of the clamp embedded in the frame of such shape that the composition will be firmly locked to them; and perhaps one of the best ways of attaining this result (shown in Fig. 3) is to perforate the clamp, in order that the composition may be compressed therein to rivet it, as it were, to the side or back of the frame, or both, as the case may be.

It is desirable, on some accounts, to make the embedded portion of the clamp of a reasonable length, and to mold it in that part of the frame beneath the mirror.

The advantage of this construction is too manifest to need comment.

Having thus fully described my invention, I claim and desire to secure by Letters Patent of the United States—

1. The combination of the retaining-frame *c*, the metallic fastenings *d*, engaging the same, and the main frame B, in which the said metallic fastenings *d* are embodied or firmly inserted, substantially as described.

2. The combination, with a mirror or similar article and with its frame B, of the retaining-frame *c* and metallic fastenings *d*, engaged with said frame *c* and with the main frame B, substantially as described.

3. The combination, as a means of fastening a mirror or other article to the frame or back supporting it, of a retaining-frame lapped upon the edge of the article to be fastened in the frame, and of the metallic fastening *b*, engaged therewith and firmly fastened in the substance of the main frame B, substantially as described.

GEORGE EASTMAN.

Witnesses:
F. F. RAYMOND, 2d,
M. W. SAWYER.